United States Patent
Panec et al.

(10) Patent No.: US 10,579,098 B2
(45) Date of Patent: Mar. 3, 2020

(54) INFERRING THE TRANSFER OF A PHYSICAL OBJECT ASSOCIATED WITH A WEARABLE DEVICE

(71) Applicant: Disney Enterprises, Inc., Burbank, CA (US)

(72) Inventors: Timothy M. Panec, Studio City, CA (US); Stephen A. Thornton, Burbank, CA (US); Katherine M. Bassett, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 100 days.

(21) Appl. No.: 15/841,888

(22) Filed: Dec. 14, 2017

(65) Prior Publication Data

US 2019/0187747 A1 Jun. 20, 2019

(51) Int. Cl.
| | |
|---|---|
| G06F 1/16 | (2006.01) |
| H04W 8/24 | (2009.01) |
| G06F 3/06 | (2006.01) |
| G06K 19/077 | (2006.01) |
| G06F 3/01 | (2006.01) |

(52) U.S. Cl.
CPC .............. *G06F 1/163* (2013.01); *G06F 3/016* (2013.01); *G06F 3/0646* (2013.01); *G06K 19/07762* (2013.01); *H04W 8/24* (2013.01)

(58) Field of Classification Search
CPC ........ G06F 1/163; G06F 3/016; G06F 3/0646; G06K 19/07762; H04W 8/24
See application file for complete search history.

(56) References Cited

U.S. PATENT DOCUMENTS

| | | | |
|---|---|---|---|
| 7,921,019 B2 | 4/2011 | Ryan et al. | |
| 8,452,259 B2 | 5/2013 | Ellis et al. | |
| 8,474,284 B2 | 7/2013 | Rush et al. | |
| 9,269,037 B2 | 2/2016 | Adelman et al. | |
| 9,313,609 B2 | 4/2016 | Prencipe | |
| 9,437,091 B2 | 9/2016 | Jenkins et al. | |
| 10,397,350 B2* | 8/2019 | Goslin | A61B 5/0022 |
| 2001/0015874 A1* | 8/2001 | Hashimoto | G11B 17/046 360/133 |
| 2003/0193859 A1* | 10/2003 | Mitsuda | G11B 27/329 369/47.13 |
| 2004/0010509 A1* | 1/2004 | Higashiura | G06F 16/21 |

(Continued)

OTHER PUBLICATIONS

Kaplan, K. Charmed Chips; Smart jewelry inspired by the promise of completely mobile computing will be making its way out of research labs.: [Home Edition], published Jan. 4, 2001, 4 pages.

*Primary Examiner* — Michael Won
(74) *Attorney, Agent, or Firm* — Patterson + Sheridan, LLP

(57) ABSTRACT

Systems, methods and computer program products to perform an operation comprising receiving, by a first wearable device from a second wearable device via wireless data transmissions, an identifier of a first tile connected to a tile interface of the second wearable device, receiving, by the first wearable device from the second wearable device via wireless data transmissions, an identifier of a second tile connected to the tile interface of the second wearable device, and determining, based on a device data structure of the first wearable device storing tile state data for the first and second wearable devices, that the second tile was transferred from the first wearable device to the second wearable device.

20 Claims, 11 Drawing Sheets

(56) References Cited

U.S. PATENT DOCUMENTS

| | | | |
|---|---|---|---|
| 2005/0105910 A1* | 5/2005 | Light | H04B 10/40 398/137 |
| 2005/0138179 A1* | 6/2005 | Encarnacion | H04L 63/10 709/227 |
| 2005/0243732 A1* | 11/2005 | Bitar | H04L 12/5601 370/241.1 |
| 2007/0155307 A1* | 7/2007 | Ng | H04H 20/61 455/3.01 |
| 2008/0104206 A1* | 5/2008 | Novik | G06Q 10/107 709/220 |
| 2009/0193149 A1* | 7/2009 | Khosravy | G06F 16/27 709/248 |
| 2009/0198702 A1* | 8/2009 | Novik | G06F 16/178 |
| 2009/0318168 A1* | 12/2009 | Khosravy | G06Q 30/0241 455/456.3 |
| 2010/0013594 A1* | 1/2010 | Komine | G05B 19/0428 340/5.8 |
| 2010/0114800 A1* | 5/2010 | Yasuda | G06Q 50/06 705/412 |
| 2011/0231542 A1* | 9/2011 | Komano | H04N 1/00344 709/224 |
| 2014/0089261 A1* | 3/2014 | Aissi | G06F 11/1461 707/621 |
| 2014/0129695 A1* | 5/2014 | Yerli | G06F 9/54 709/224 |
| 2015/0177939 A1 | 6/2015 | Anderson et al. | |
| 2016/0132046 A1* | 5/2016 | Beoughter | G05B 19/4184 700/17 |
| 2016/0134578 A1* | 5/2016 | Ross | H04L 51/32 709/206 |
| 2016/0278006 A1* | 9/2016 | Lee | H04W 76/10 |
| 2016/0283930 A1* | 9/2016 | Haga | G06F 1/1632 |
| 2016/0323271 A1 | 11/2016 | Hinman et al. | |
| 2016/0350523 A1* | 12/2016 | Tanno | G06F 21/44 |
| 2017/0032352 A1* | 2/2017 | Koeppen | G06Q 20/24 |
| 2017/0054763 A1* | 2/2017 | Pedersen | H04L 65/1069 |
| 2017/0280437 A1* | 9/2017 | Xu | H04W 76/10 |
| 2018/0234777 A1* | 8/2018 | Roeck | G10L 19/22 |
| 2019/0222975 A1* | 7/2019 | Panec | G06F 1/163 |

* cited by examiner

FIG. 4
DAILY ACTIVITY STORY
You saw your friend LaughyDuck!    10:00 AM
Your friend LaughyDucky gave you a Laughing Duck tile!    10:03 AM
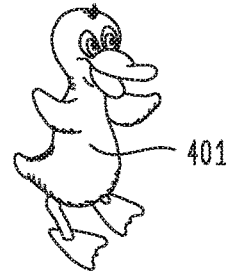
You encountered an unknown user.    11:00 AM
You saw your friend HappyMouse!    12:00 PM
You and HappyMouse traded tiles!    12:01 PM
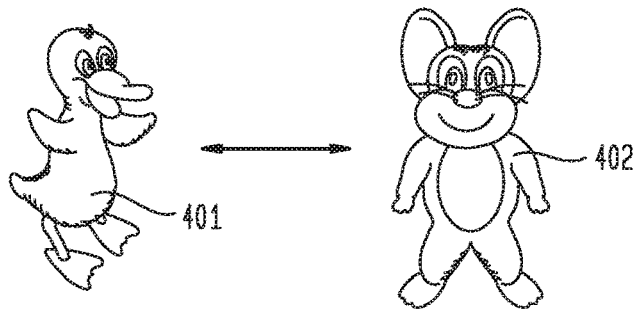
You saw your friend DapperDog!    1:00 PM
You gifted your Happy Mouse tile to DapperDog!    1:01 PM
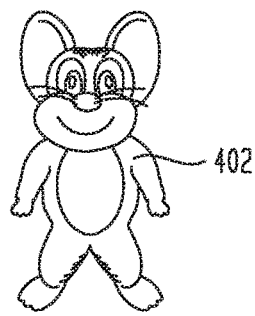

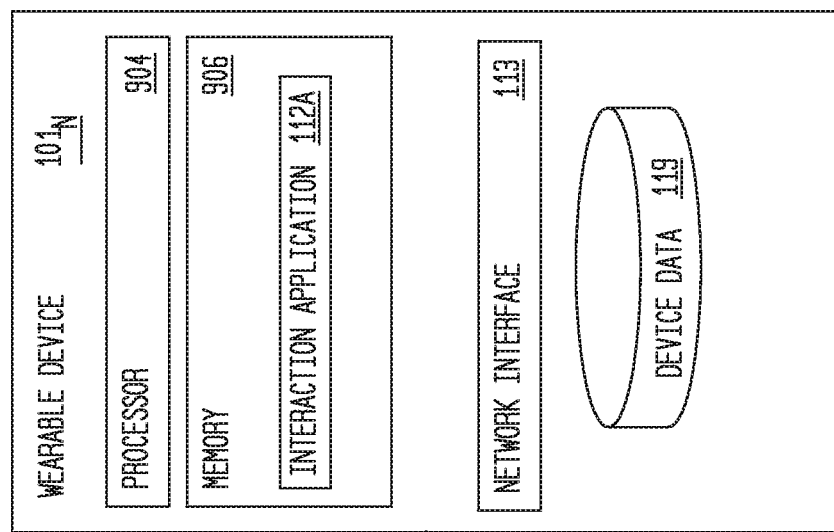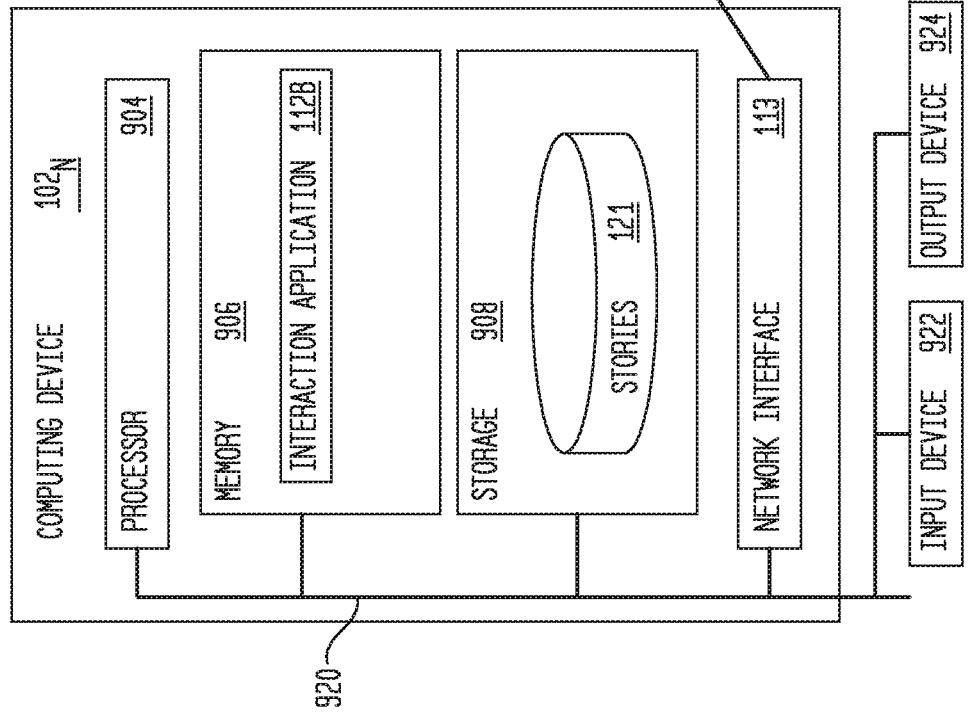
FIG. 9

INFERRING THE TRANSFER OF A PHYSICAL OBJECT ASSOCIATED WITH A WEARABLE DEVICE

BACKGROUND

Field of the Invention

The present disclosure relates to wearable devices. More specifically, the disclosure relates to inferring the transfer of a physical object associated with wearable devices.

Description of the Related Art

Wearable devices often have limited circuitry due to size constraints. As such, wearable devices often have limited capabilities. However, it is possible to leverage the available circuitry to extend the capabilities of such wearable devices.

SUMMARY

According to one embodiment of the present disclosure, a method comprises receiving, by a first wearable device from a second wearable device via wireless data transmission, an identifier of a first tile connected to a tile interface of the second wearable device, receiving, by the first wearable device from the second wearable device via wireless data transmission, an identifier of a second tile connected to the tile interface of the second wearable device, and determining, based on a device data structure of the first wearable device storing tile state data for the first and second wearable devices, that the second tile was transferred from the first wearable device to the second wearable device.

In another embodiment, a system comprises a processor and a memory containing a program which when executed by the processor performs an operation comprising receiving, by a first wearable device from a second wearable device via wireless data transmission, an identifier of a first tile connected to a tile interface of the second wearable device, receiving, by the first wearable device from the second wearable device via wireless data transmission, an identifier of a second tile connected to the tile interface of the second wearable device, and determining, based on a device data structure of the first wearable device storing tile state data for the first and second wearable devices, that the second tile was transferred from the first wearable device to the second wearable device.

In another embodiment, a non-transitory computer readable medium stores instructions, which, when executed by a processor, performs an operation comprising receiving, by a first wearable device from a second wearable device via wireless data transmission, an identifier of a first tile connected to a tile interface of the second wearable device, receiving, by the first wearable device from the second wearable device via wireless data transmission, an identifier of a second tile connected to the tile interface of the second wearable device, and determining, based on a device data structure of the first wearable device storing tile state data for the first and second wearable devices, that the second tile was transferred from the first wearable device to the second wearable device.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 4 illustrates an example story reflecting the inferred transfers of physical objects associated with wearable devices, according to one embodiment.

FIG. 9 illustrates a system configured to infer the transfer of a physical object associated with a wearable device, according to one embodiment.

DETAILED DESCRIPTION

Embodiments disclosed herein provide techniques to allow wearable devices to infer when physical objects are transferred between wearable devices. Generally, embodiments disclosed herein relate to wearable devices that have a physical interface for attaching physical objects (also referred to as "tiles" herein). Once connected via the interface, data is transferred from the tile to the wearable device. However, the wearable device has limited circuitry which, due to constraints, cannot be extended to include circuitry that is used to determine whether a user has transferred a tile to another user. Advantageously, embodiments disclosed herein configure the wearable device to infer when a transfer of one or more tiles has occurred. The wearable devices are able to communicate with each other via wireless data transmission, which does not require acknowledgments, or by wireless data connections. By leveraging wireless data transmissions and the data received when a tile is inserted into a wearable device, the wearable devices are able to determine when tiles have been transferred from one wearable device to another. Doing so allows more accurate tracking of tiles, and generation of a "story" outputted via a graphical user interface which reflects the encounters between wearable devices and transfer of tiles there between.

Figure 1:
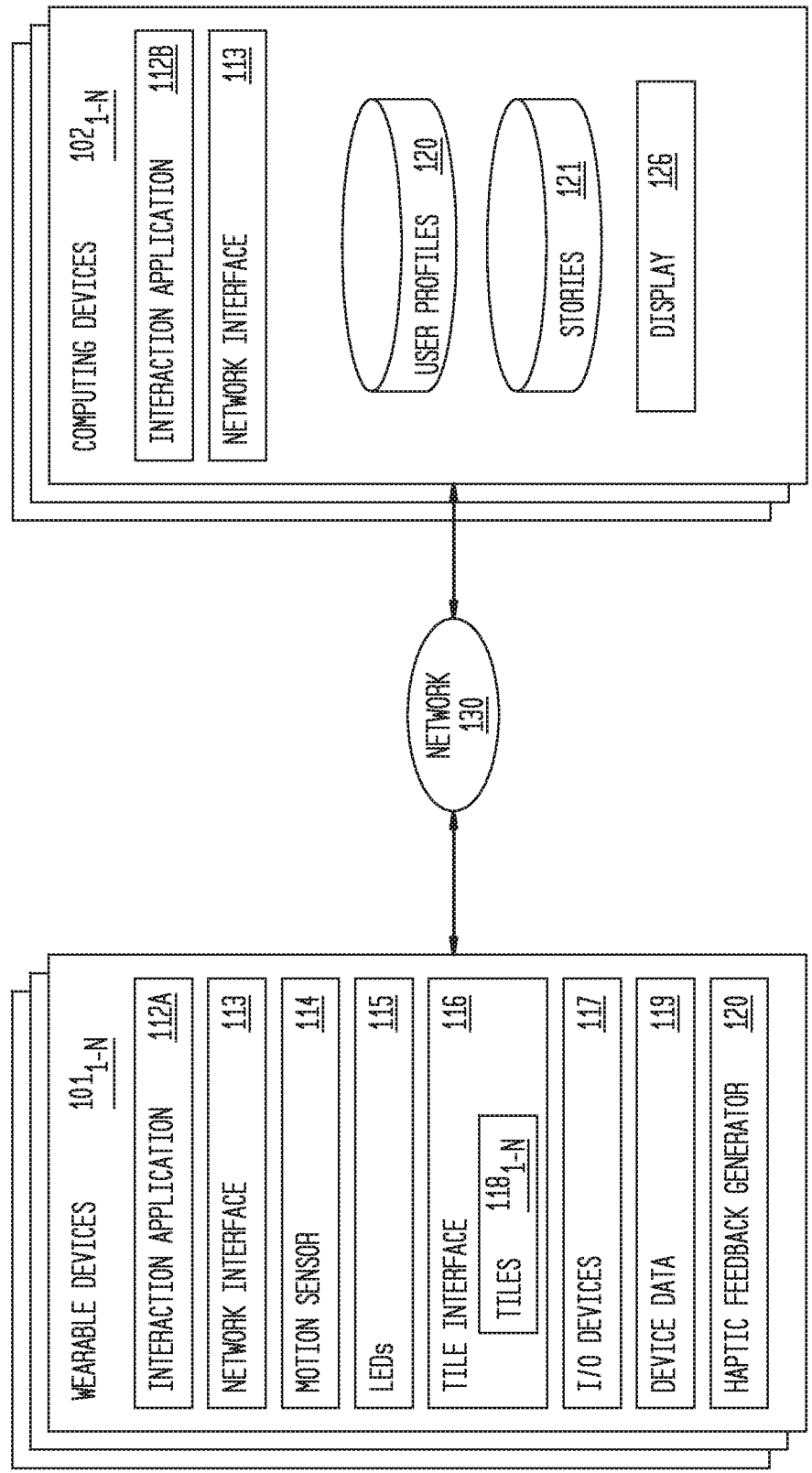
FIG. 1 illustrates a system which infers the transfer of a physical object associated with a wearable device, according to one embodiment.

FIG. 1 illustrates a system 100 which infers the transfer of a physical object associated with a wearable device, according to one embodiment. As shown, the system 100 includes a plurality of wearable devices $101_{1-N}$ and a plurality of computing devices $102_{1-N}$ communicably coupled by a network 130. As shown, the wearable devices $101_{1-N}$ include an instance of an interaction application 112A, a network interface 113, a motion sensor 114, one or light emitting diodes (LEDs) 115, a tile interface 116 for accepting tiles 118, one or more input/output (I/O) devices 117, a data store of device data 119, and a haptic feedback generator 120. The wearable devices $101_{1-N}$ are representative of any type of wearable device that includes a tile interface 116, such as a smart watch, fitness tracker, and the like. The network interface 113 facilitates wireless data transmissions between a given wearable device $101_{1-N}$ and other wearable devices $101_{1-N}$, as well as between the wearable devices $101_{1-N}$ and the computing devices $102_{1-N}$. Example network interfaces 113 include wireless local area network (WLAN) interfaces, Bluetooth® interfaces, radio frequency interfaces that allow data communications between two wearable devices $101_{1-N}$, and the like. In some embodiments, the network interfaces 113 emit broadcast wireless communications that are received by other wearable devices $101_{1-N}$ in proximity. The motion sensor 114 is representative of any hardware module which can detect motion, such as an accelerometer, gyroscope, global positioning system (GPS) radios, and some network interfaces 113. The I/O devices 117 are representative of one or more buttons for receiving user input. The haptic feedback generator 120 is representative of any device configured to output haptic feedback, such as an actuator.

The tile interface 116 is representative of hardware modules configured to interface with the hardware tiles 118. The tiles $118_{1-N}$ are representative of hardware elements that can plug into the tile interface 116, and transfer data to the wearable devices $101_{1-N}$ via a data connection. Each of the tiles $118_{1-N}$ may be associated with a fictional character, or "emoji", and include a depiction of the associated fictional character (or emoji). In at least one embodiment, each tile $118_{1-N}$ is further associated with a predefined emotion. For example, a "happy duck" tile $118_{1-N}$ may be a physical tile with a smiling duck drawn on it, which, when plugged in to the tile interface 116, allows the user to convey that they are currently happy. Each tile $118_{1-N}$ stores an identifier that is unique to each character and/or emotion. For example, all "happy duck" tiles $118_{1-N}$ may share the same identifier, while all "silly penguin" tiles $118_{1-N}$ may share the same identifier, different than the "happy duck" identifier. The unique identifier, when received via the tile interface 116, is stored in a record in the device data 119. The record stored in the device data 119 may also reflect the emotion associated with the tile $118_{1-N}$. The network interface 113 continuously broadcasts the identifier of the tile $118_{1-N}$ that is inserted in the tile interface 116. Furthermore, the wearable devices $101_{1-N}$ are configured to output a predefined light pattern via associated with the unique identifier via the LEDs 115. For example, if there are four LEDs 115 included in the wearable devices $101_{1-N}$, the identifier of the "silly penguin" tile 118 may be predefined to cause two of the LEDs 115 to emit a red light, and the other two LEDs 115 to emit a blue light. Similarly, the identifier of the "happy duck" tile 118 may cause two of the LEDs 115 to emit orange light, and the other two LEDs 115 to emit blue light. Furthermore, color animation via the LEDs 115 may be used to convey emotion, e.g., slowly pulsing all LEDs 115 to fade in and fade out blue light may convey sadness, while a circular pattern outputted via the LEDs 115 that increases in speed may convey happiness.

As shown, each of the computing devices $102_{1-N}$ include a respective instance of the interaction application 112B, a network interface 113, a data store of user profiles 120, a data store of stories 121, and a display device 126. The computing devices $102_{1-N}$ are representative of any type of computing device, such as a smartphone, wearable computing device, tablet computer, portable game console, laptop computer, desktop computer, and the like. The user profiles 120 store profile data for a plurality of different users, including user attributes (e.g., emotions, locations visited, activities engaged in, achievements, relationships, friendships between wearable devices $101_{1-N}$, exchanges of tiles 118, etc.). The stories 121 include one or more stories generated by the interaction application 112B for a given user based on the other wearable devices $101_{1-N}$ detected by the wearable devices $101_{1-N}$ of an associated user, as well as any transfers of tiles $118_{1-N}$ between the associated user and other users. In least one embodiment, the stories 121 are generated based on story templates, which define plot elements used to generate emoji stories for a user. For example, the story templates may include plot elements of different movies, books, or other videos, that can be adapted to the different experiences of a user on a given day.

The interaction application 112 (which includes instances 112A and 112B) is configured to track tiles 118 affixed to a given wearable device $101_{1-N}$ via the tile interface 116, monitor locations visited by the user, and identify social interactions between two or more users (e.g., via the corresponding wearable devices $101_{1-N}$ and/or computing devices $102_{1-N}$). The instance of the interaction application 112B is further configured to generate the stories 121 for a given user. For example, as previously stated, the wearable devices $101_{1-N}$ are configured to detect other wearable devices $101_{1-N}$ via the respective network interfaces 113. When the network interface 113 of a wearable device $101_{1-N}$ receives broadcast data transmitted by wearable device $101_{1-N}$, the respective instances of the interaction application 112A may broadcast an indication of an identifier of the wearable device $101_{1-N}$ and the identifier of the tile $118_{1-N}$ currently inserted in the tile interface 116. In at least one embodiment, the identifier of a given wearable device $101_{1-N}$ is the media access control (MAC) address of the network interface 113 of the wearable device $101_{1-N}$. The respective instances of the interaction application 112A may then record an indication of the encounter between the wearable devices $101_{1-N}$ in the device data 119. The indication may include the wearable devices $101_{1-N}$ that participated in the encounter, the identifier of the tiles $118_{1-N}$ (if present) in each wearable device $101_{1-N}$, and a timestamp when the encounter occurred.

The interaction application 112A is further configured to infer when users transfer one or more tiles $118_{1-N}$. For example, a wearable device $101_1$ which includes a tile $118_1$ connected via the tile interface 116 may encounter a wearable device $101_2$ that does not include any tile $118_{1-N}$ connected via the tile interface 116. Subsequently (e.g., within a predefined time threshold), the wearable device $101_1$ may no longer include the tile $118_1$, while the wearable device $101_2$ includes the tile $118_1$. As such, the respective instances of the interaction application 112A may determine that the user of the wearable device $101_1$ has transferred the tile $118_1$ to the user of wearable device $101_2$. The respective instances interaction application 112A may store an indication of the transfer in the device data 116. The instance of the interaction application 112A on the wearable device $101_2$ may further reflect the transfer via feedback generated by the LEDs 115, e.g., outputting a light pattern associated with the tile $118_1$. Furthermore, the interaction application 112A may transfer the data stored in the device data 116 (reflecting the encounter and transfer) to the instance of the interaction application 112B on the computing devices $102_{1-N}$, allowing the instance of the interaction application 112B on the computing devices $102_{1-N}$ to generate a story 120 reflecting the transfer and the encounter between the wearable devices $101_{1,2}$.

Figure 2A:
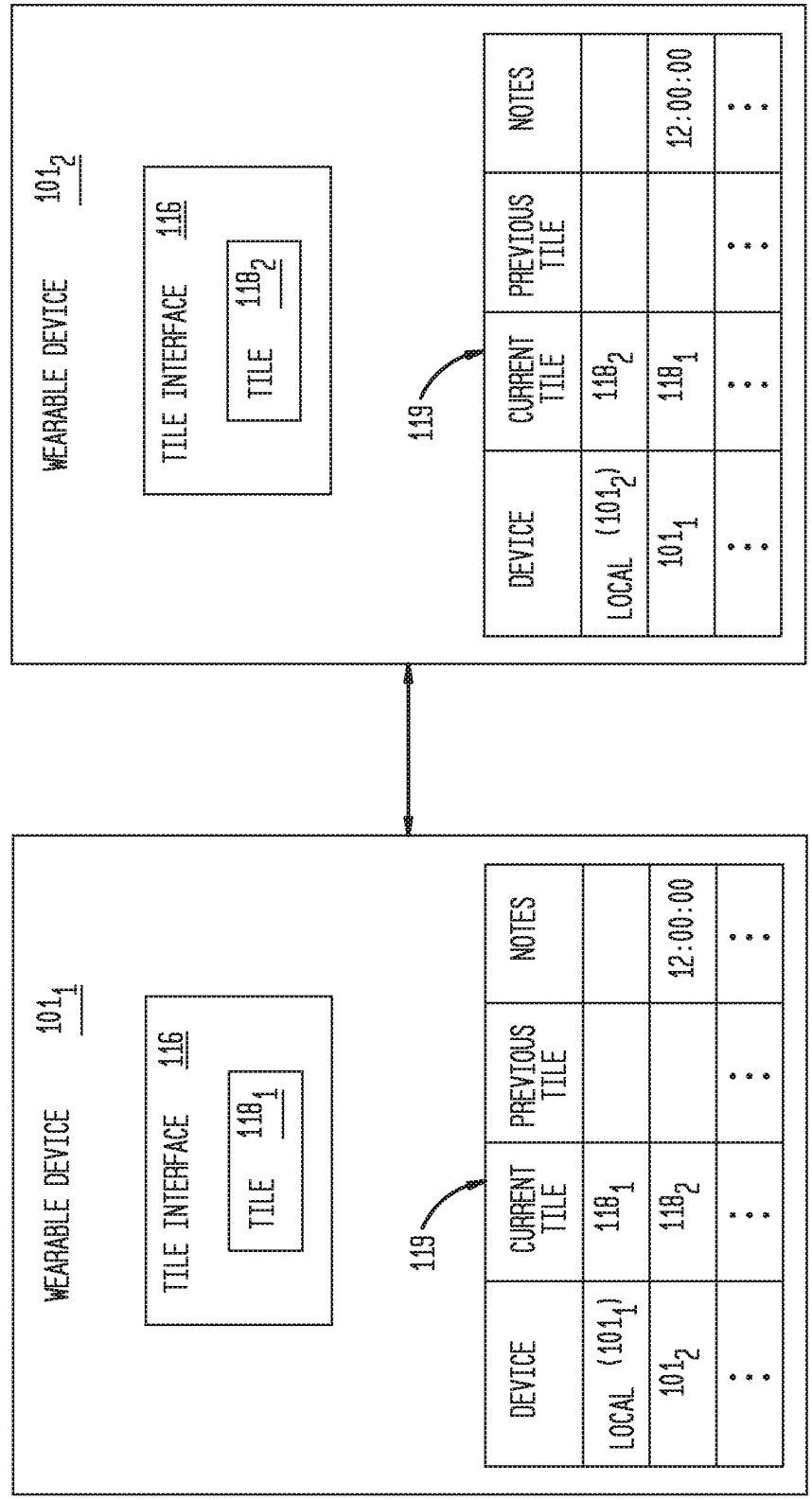
FIGS. 2A-2B illustrate examples of inferring the transfer of a physical object associated with a wearable device, according to one embodiment.

FIG. 2A illustrates an example of inferring the transfer of one or more tiles $118_{1-N}$ between wearable devices $101_{1-N}$, according to one embodiment. As shown, FIG. 2A depicts two example wearable devices $101_{1,2}$. Illustratively, wearable device $101_1$ includes the tile $118_1$ in the tile interface 116, while wearable device $101_2$ includes the tile $118_2$ in the tile interface 116. As shown, each wearable device $101_{1,2}$ depicts a respective example table of device data 119 generated by the respective instances of the interaction application 112A on each wearable device $101_{1,2}$. Illustratively, each table of device data 119 includes columns to store indications of a wearable device $101_N$, a current tile $118_{1-N}$, a previous tile $118_{1-N}$, and any notes. Although reference numerals are depicted in the device data 119, in some embodiments, the unique identifiers of each wearable device $101_{1-N}$ and tile $118_{1-N}$ are stored in the device data 119. As shown, the device data 119 for wearable device $101_1$ reflects that wearable device $101_1$ currently includes the tile $118_1$, and that wearable device $101_1$ encountered wearable device $101_2$, which currently includes the tile $118_2$. The notes column reflects a timestamp at which the encounter occurred. Similarly, the device data 119 for wearable device $101_2$ reflects that wearable device $101_2$ currently includes the tile $118_2$, and that wearable device $101_2$ encountered wearable device $101_1$, which currently includes the tile $118_1$. Again, the notes column reflects a timestamp at which the encounter occurred, which may be determined based on a clock of the wearable devices $101_{1-N}$.

Figure 2B:
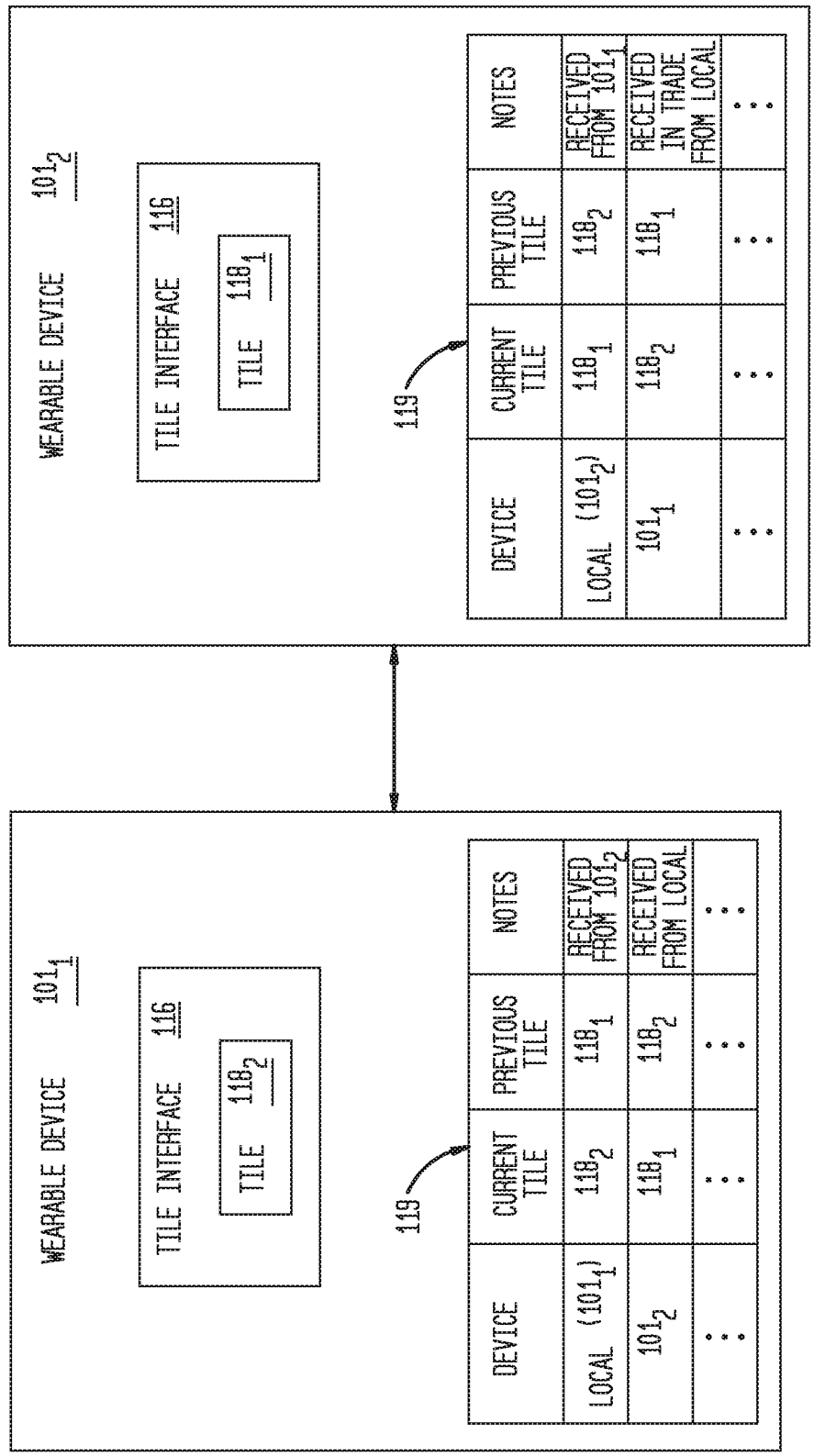

FIG. 2B depicts a status of the wearable devices $101_{1,2}$ after the users of the wearable devices $101_{1,2}$ have exchanged the tiles $118_{1,2}$. As shown, the wearable device $101_1$ includes the tile $118_2$ in the tile interface 116, while wearable device $101_2$ includes the tile $118_1$ in the tile interface 116. As such, the instances of the interaction application 112A have updated the respective device data 119 to reflect the exchange. As shown, the device data 119 for wearable device $101_1$ reflects that wearable device $101_1$ currently includes the tile $118_2$, that the wearable device $101_1$ previously included tile $118_1$, and that wearable device $101_1$ received the tile $118_2$ in an exchange with wearable device $101_2$ (the timestamp of the exchange is not pictured for the sake of clarity). Similarly, the device data 119 of wearable device $101_1$ reflects that wearable device $101_2$ currently includes the tile $118_1$, that wearable device $101_2$ previously included tile $118_1$, and that wearable device $101_2$ received the tile $118_1$ from wearable device $101_1$. Generally, the interaction application 112A may comprise logic configured to compare the current and previous tiles in the device data 119, and determine when tiles $118_{1-N}$ have been transferred by users. As such, the interaction application 112A stores an indication of the transfers in the respective instances of the device data 119. The interaction application 112A may also reflect the transfer by outputting light via the LEDs 115 of the wearable device $101_1$, where the outputted light is based on an association between the identifier of the received tiles $118_2$.

Furthermore, as shown, the device data 119 of wearable device $101_2$ reflects that wearable device $101_2$ currently includes the tile $118_1$, that wearable device $101_2$ previously included tile $118_1$, and that wearable device $101_2$ received the tile $118_1$ from wearable device $101_1$. Further still, the device data 119 reflects that wearable device $101_1$ currently includes the tile $118_2$, that the wearable device $101_1$ previously included tile $118_1$, and that wearable device $101_1$ received the tile $118_2$ in an exchange with wearable device $101_2$. The interaction application 112A may also reflect the transfer by outputting light via the LEDs 115 of the wearable device $101_2$, where the outputted light is based on an association between the identifier of the received tile $118_1$. The instances of the interaction application 112A may periodically send the data stored in the device data 119 to the instances of the interaction application 112B, where the instance of the interaction application 112B generates a story 121 for the respective users. As stated, the story 121 reflects the encounter between the devices $101_{1,2}$ as well as the exchange of the tiles $118_{1,2}$.

Figure 3A:
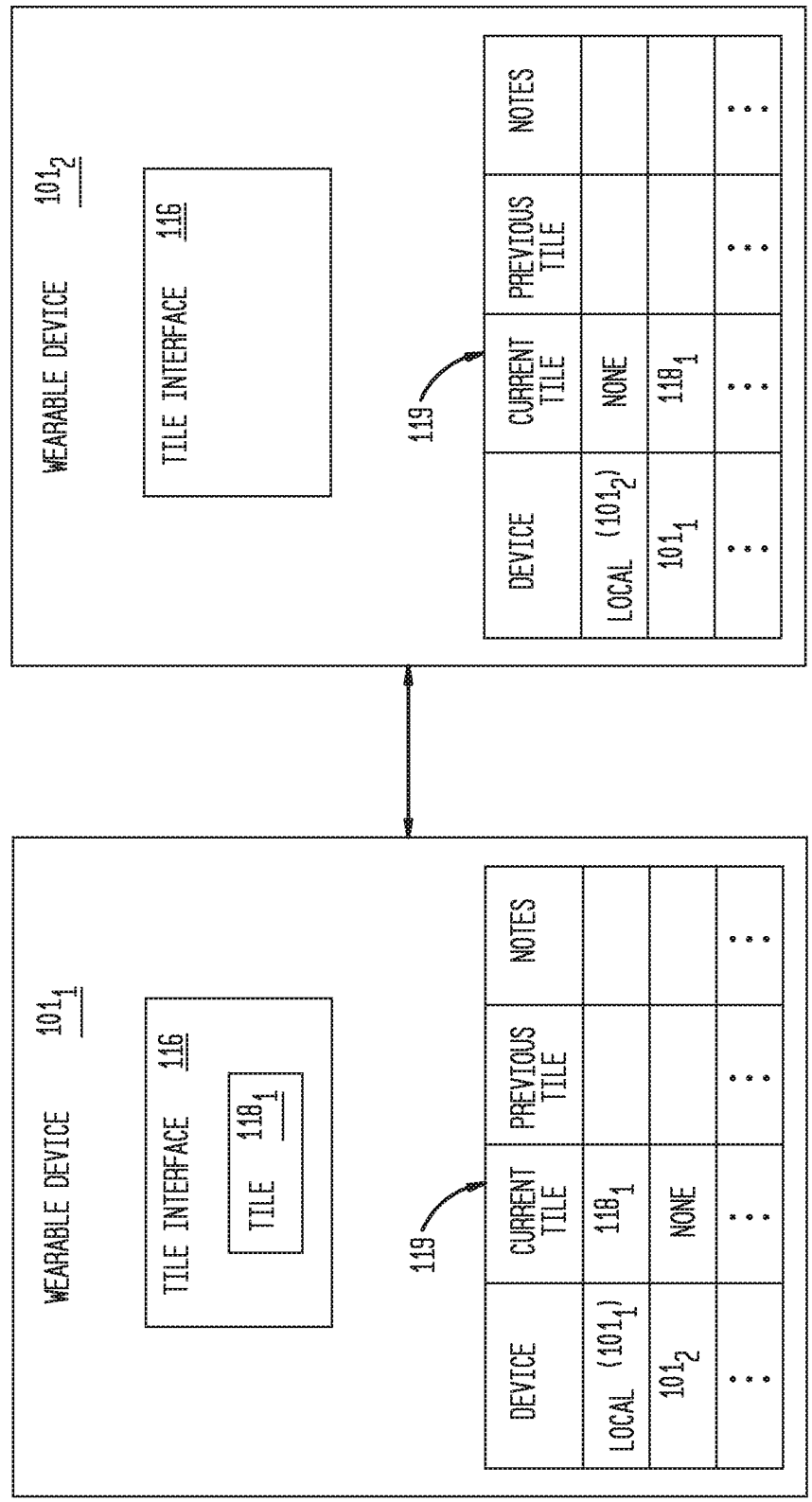
FIGS. 3A-3B examples of inferring the transfer of a physical object associated with a wearable device, according to one embodiment.

FIG. 3A illustrates an example of inferring the transfer of one or more tiles $118_{1-N}$ between wearable devices $101_{1-N}$, according to one embodiment. As shown, FIG. 3A depicts the example wearable devices $101_{1,2}$. Illustratively, wearable device $101_1$ includes the tile $118_1$ in the tile interface 116, while wearable device $101_2$ does not include any tiles $118_{1-N}$ in the tile interface 116. As shown, the device data 119 for wearable device $101_1$ reflects that wearable device $101_1$ currently includes the tile $118_1$, and that wearable device $101_1$ encountered wearable device $101_2$, which does not include any tiles $118_{1-N}$ in the tile interface 116. Similarly, the device data 119 for wearable device $101_2$ reflects that wearable device $101_2$ does not include any tiles $118_{1-N}$ in the tile interface 116, and that wearable device $101_2$ encountered wearable device $101_1$, which currently includes the tile $118_1$.

Figure 3B:
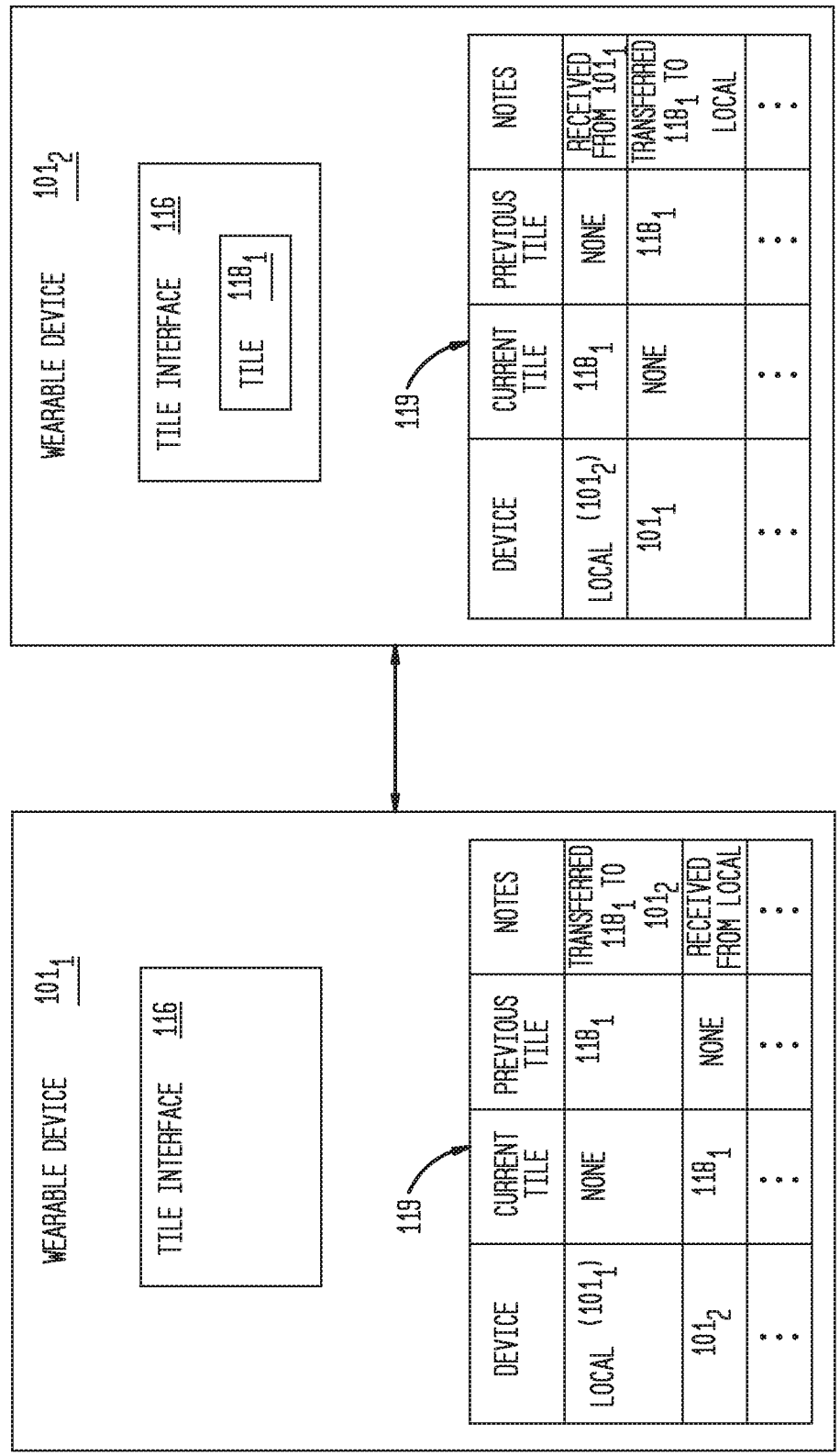

FIG. 3B depicts a status of the wearable devices $101_{1,2}$ after the user of wearable devices $101_1$ gifted the tile $118_1$ to the user of wearable device $101_2$. As shown, wearable device $101_2$ includes the tile $118_1$ in the tile interface 116, while wearable device $101_1$ does not include any tiles $118_{1-N}$ in the tile interface 116. Based on the detected transfer, the interaction applications 112A update the device data 119 accordingly. As shown, the device data 119 for wearable device $101_1$ reflects that wearable device $101_1$ currently does not include any tiles $118_{1-N}$, that the wearable device $101_1$ previously included tile $118_1$, and that wearable device $101_1$ gifted the tile $118_1$ to wearable device $101_2$. Similarly, the device data 119 of wearable device $101_1$ reflects that wearable device $101_2$ currently includes the tile $118_1$, that wearable device $101_2$ previously included no tiles $118_{1-N}$, and that wearable device $101_2$ received the tile $118_1$ from wearable device $101_1$.

Furthermore, as shown, the device data 119 of wearable device $101_2$ reflects that wearable device $101_2$ currently includes the tile $118_1$, that wearable device $101_2$ previously included no tiles $118_{1-N}$, and that wearable device $101_2$ received the tile $118_1$ from wearable device $101_1$. Further still, the device data 119 reflects that wearable device $101_1$ currently does not include any tiles $118_{1-N}$, that the wearable device $101_1$ previously included tile $118_1$, and that wearable device $101_1$ gifted the tile $118_1$ to wearable device $101_2$. The interaction application 112A may also reflect the transfer by outputting light via the LEDs 115 of the wearable device $101_2$, where the outputted light is based on an association between the identifier of the received tile $118_1$. Again, the instances of the interaction application 112A may periodically send the data stored in the device data 119 to the instances of the interaction application 112B, where the instance of the interaction application 112B generates a story 121 for the respective users. As stated, the story 121 reflects the encounter between the devices $101_{1,2}$ as well as the exchange of the tile $118_1$.

FIG. 4 illustrates a display device 126 outputting an example story 120 reflecting the inferred transfers of tiles $118_{1-N}$, according to one embodiment. As shown, the story 120 includes an indication of encounters of the wearable device $101_N$ of a user of the computing device $102_N$ and other wearable devices $101_{1-N}$. For example, as shown, the story 120 reflects that the user encountered their friend "LaughyDucky" at 10:00 AM, an unknown user at 11:00 AM, their friend "HappyMouse" at 12:00 PM, and their friend "DapperDog" at 1:00 PM. A user may be reflected as "unknown" in the story 120 if the users of the corresponding wearable devices $101_{1-N}$ have not established a "friendship". To establish a friendship, the users of the wearable devices $101_{1-N}$ may press a button (e.g., an I/O device 117) on the wearable device $101_{1-N}$ for a predefined amount of time. Doing so allows the wearable devices $101_{1-N}$ to engage in communications via the network interfaces 113 to establish a friendship. In at least one embodiment, an indication of the friendship is stored in the device data 119. Furthermore, as shown, the story 120 reflects transfers of tiles $118_{1-N}$. For example, as shown, the story 120 indicates that a friend gave the user a "LaughingDuck" tile 118. An example emoji 401 corresponding to the tile 118 is also depicted in the story 120. Similarly, the story 120 reflects that two users traded tiles, and includes emoji 401-402 depicting the trade.

Figure 5:
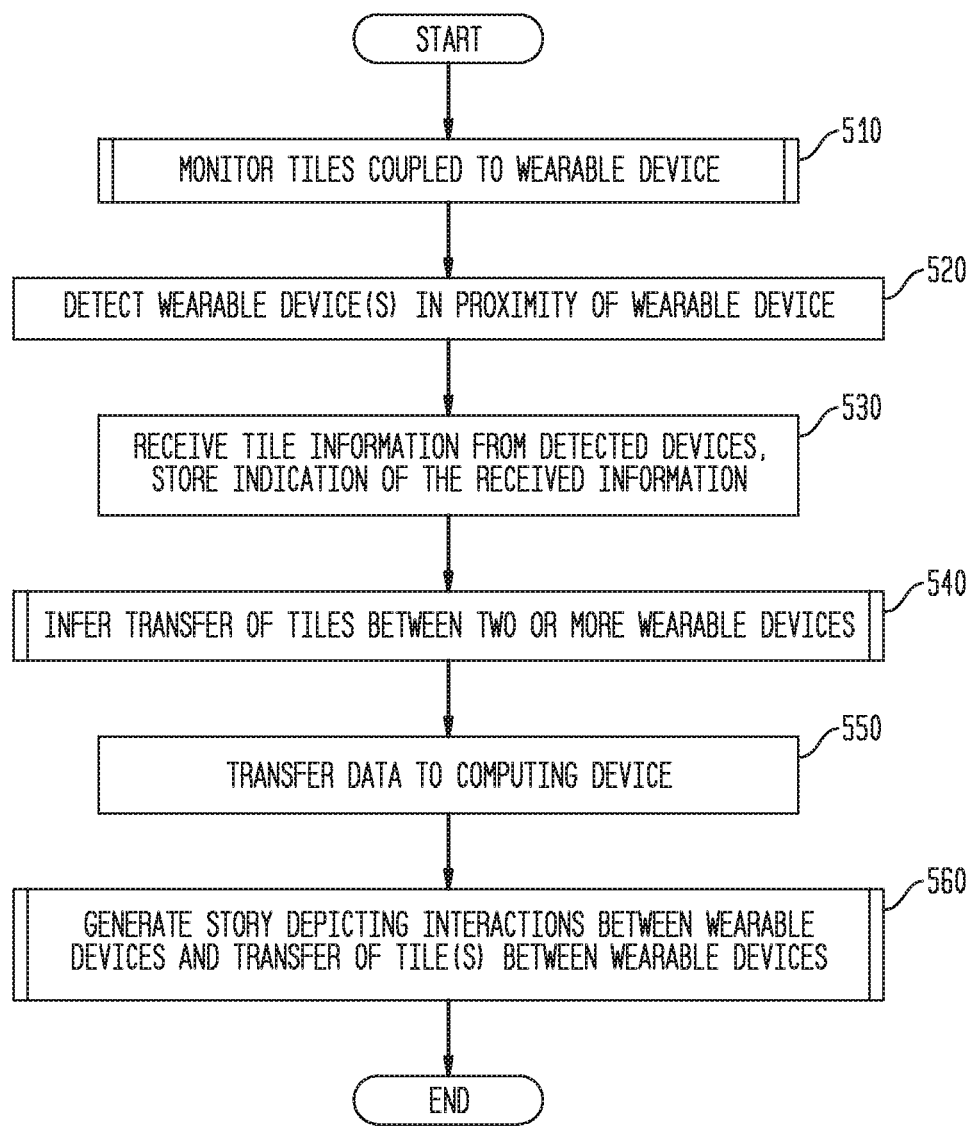
FIG. 5 is a flow chart illustrating a method to infer the transfer of a physical object associated with a wearable device, according to one embodiment.

FIG. 5 is a flow chart illustrating a method 500 to infer the transfer of a physical object associated with a wearable device, according to one embodiment. As shown, the method 500 begins at block 510, described in greater detail with reference to FIG. 6, where the interaction application 112A of a first wearable device $101_{1-N}$ monitors tiles $118_{1-N}$ that are coupled to the tile interface 116. Generally, when a tile $118_N$ is attached to the tile interface 116, the interaction application 112A receives the identifier of the tile $118_N$, and stores an indication of the identifier in the device data 119. The interaction application 112A may also cause the LEDs 115 to emit lights that are associated with the identifier of the tile $118_N$. At block 520, the first wearable device $101_{1-N}$ detects one or more other wearable device(s) $101_{1-N}$ in proximity via the network interface 113. Generally, the wearable devices $101_{1-N}$ are configured to engage in wireless communications with each other when the devices $101_{1-N}$ are within a predefined distance. At block 530, the first wearable device $101_N$ receives an indication of the tile(s) $118_{1-N}$ in the tile interface 116 of the wearable device(s) $101_{1-N}$ detected at block 520. For example, if a second wearable device $101_{1-N}$ detected at block 520 has a "CheerfulCat" tile $118_N$ in the interface 116, the second wearable device $101_{1-N}$ would transmit an indication of the MAC address of its network interface 113 and the unique identifier associated with the "CheerfulCat" tile $118_N$. The interaction application 112A of the first wearable device $101_{1-N}$ then stores an indication of the identifiers in the device data 119.

At block 540, described in greater detail with reference to FIG. 7, the interaction application 112A of the first wearable device $101_{1-N}$ infers the transfer of tiles $118_{1-N}$ between two or more wearable devices. Generally, the interaction application 112A leverages the information stored in the device data 119 to determine when a transfer has been made. At block 550, the interaction application 112A transfers data to the instance of the interaction application 112B on a computing device $102_N$ associated with the first wearable device $101_{1-N}$. For example, the interaction application 112A may transmit the information reflecting which wearable devices $101_{1-N}$ were detected at block 520 (which may include multiple devices detected at different times), which tiles $118_{1-N}$ the detected devices $101_{1-N}$ included, and any tile transfer data inferred at block 540. At block 560, described in greater detail with reference to FIG. 8, the interaction application 112B on the computing device $102_N$ associated with the first wearable device $101_{1-N}$ generates a story 121 depicting the interactions between wearable devices $101_{1-N}$ and the transfer of tiles $118_{1-N}$ between the wearable devices $101_{1-N}$. Generally, the steps of the method 500 may be performed periodically to detect tiles in a first wearable device $101_{1-N}$, detect other wearable devices $101_{1-N}$ in proximity of the first wearable device $101_{1-N}$, exchange data there between, and infer the transfer of tiles $118_{1-N}$ between the first wearable device $101_{1-N}$ and other wearable devices $101_{1-N}$. Doing so allows the interaction application 112B to generate a story reflecting one or more interactions and transfers during a given time period.

Figure 6:
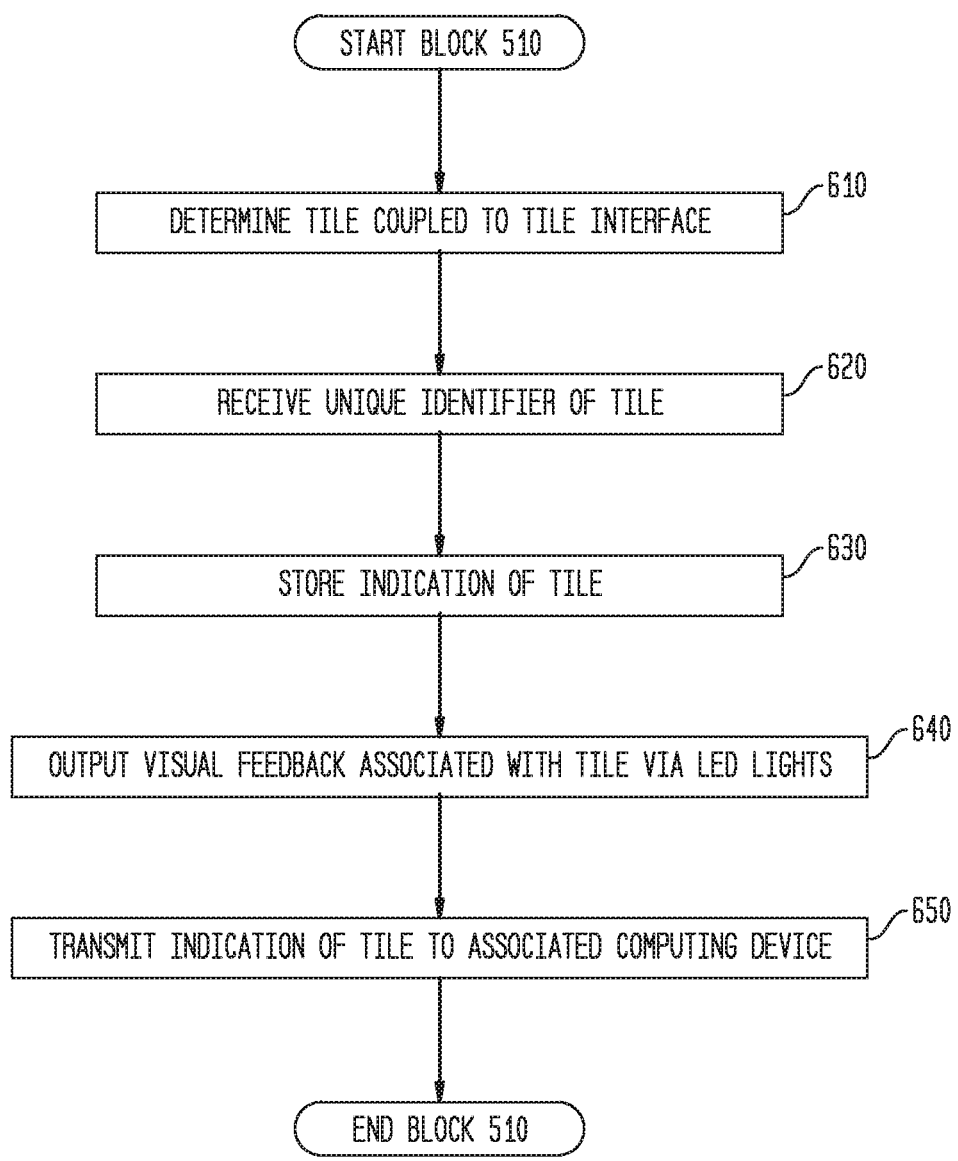
FIG. 6 is a flow chart illustrating a method to monitor tiles coupled to a wearable device, according to one embodiment.

FIG. 6 is a flow chart illustrating a method 600 corresponding to block 510 to monitor tiles coupled to a wearable device, according to one embodiment. As shown, the method 600 begins at block 610, where the interaction application 112A determines that a tile $118_N$ has been coupled (or attached, inserted, etc.) to the tile interface 116 of a first wearable device $101_{1-N}$, e.g., by the completion of a circuit in the interface 116 by a metal connector of the tile $118_N$. At block 620, the interaction application 112A receives the unique identifier of the tile $118_N$. At block 630, the interaction application 112A stores an indication of the inserted tile in the device data 119 of the first wearable device $101_{1-N}$. Generally, the interaction application 112A stores an indication of the identifier of the tile, a timestamp the tile is inserted, and optionally updates existing entries in the device data 119 (e.g., moves a "current tile" to the "previous tile" entry in the device data 119). At block 640, the interaction application 112A causes the LED lights 115 to output visual feedback associated with the inserted tile $118_N$. At block 650, the interaction application 112A optionally transmits an indication of the inserted tile to the instance of the interaction application 112B on a computing device $102_{1-N}$ associated with the first wearable device $101_{1-N}$.

Figure 7:
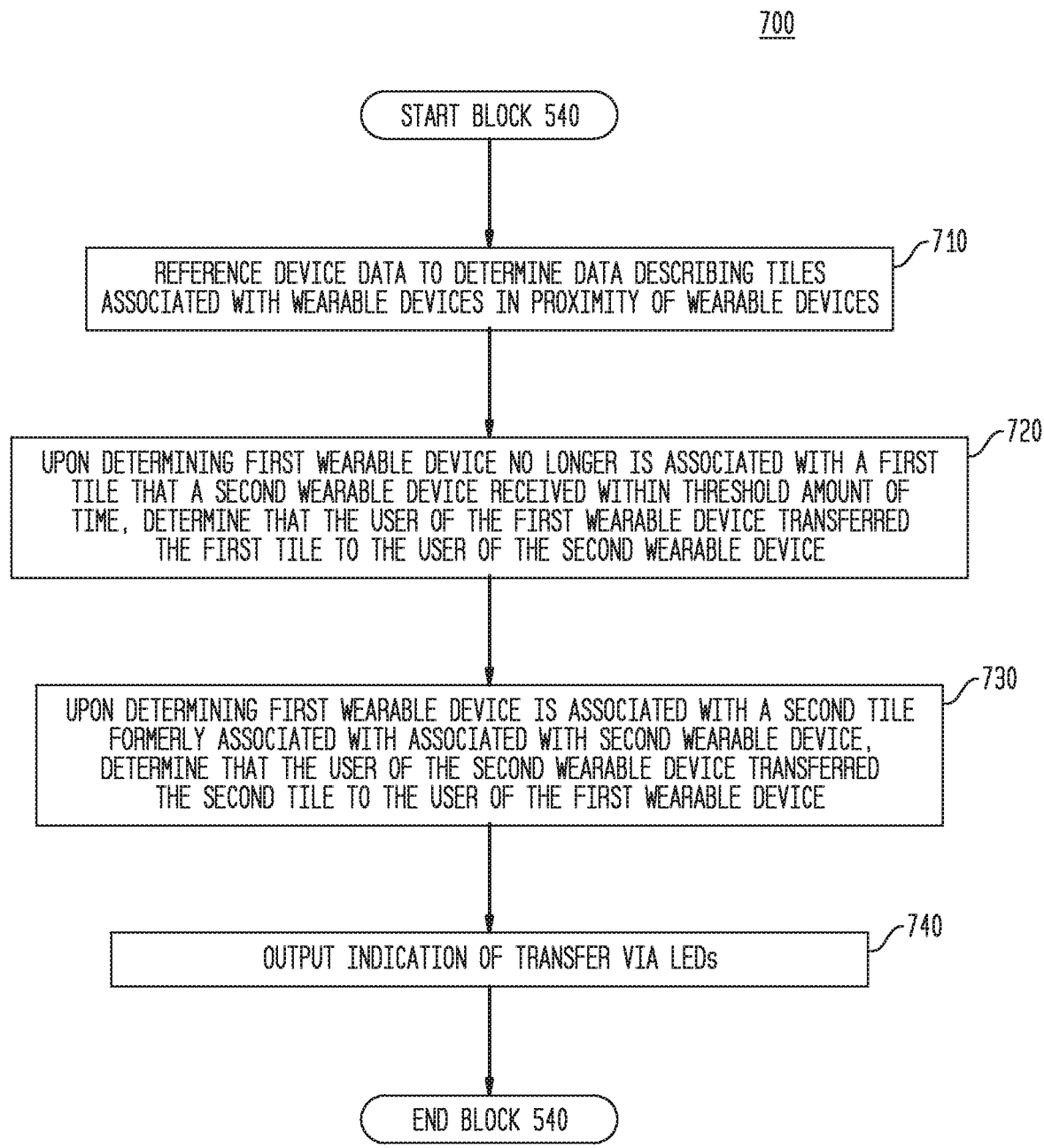
FIG. 7 is a flow chart illustrating a method to infer the transfer of tiles between two or more wearable devices, according to one embodiment.

FIG. 7 is a flow chart illustrating a method 700 corresponding to block 540 to infer the transfer of tiles between two or more wearable devices, according to one embodiment. As shown, the method 700 begins at block 710, where the interaction application 112A references the device data 119 of the first wearable device $101_{1-N}$ to determine the tiles $118_{1-N}$ that are associated with the first wearable device $101_{1-N}$ and other wearable devices $101_{1-N}$ that are in proximity of the first wearable device $101_{1-N}$. As previously stated, the device data 119 stores indications of recently encountered wearable devices $101_{1-N}$ as well as any tiles $118_{1-N}$. For example, the device data 119 may reflect that the first wearable device $101_{1-N}$ includes a "SadSally" tile $118_{1-N}$ and a second wearable device currently includes a "SleepySam" tile $118_{1-N}$. At block 720, the interaction application 112A determines, based on the device data 119 and data received from the second wearable device $101_{1-N}$, that the first wearable device $101_{1-N}$ no longer includes a tile $118_{1-N}$ that the second wearable device $101_{1-N}$ now includes. The interaction application 112A then infers that the user of the first wearable device $101_{1-N}$ transferred the tile $118_{1-N}$ to the user of the second wearable device $101_{1-N}$. For example, the interaction application 112A of the first wearable device $101_{1-N}$ may determine, based on the device data 119, that the first wearable device $101_{1-N}$ no longer includes the "SadSally" tile $118_{1-N}$. The interaction application 112A of the second wearable device $101_{1-N}$ may also transmit an indication of the identifier of the "SadSally" tile $118_{1-N}$ to the instance of the interaction application 112A on the first wearable device $101_{1-N}$ within a predefined amount of time. The interaction application 112A may then reference the device data 119 to determine that the second wearable device $101_{1-N}$ now includes a tile $118_{1-N}$ that the first wearable device $101_{1-N}$ had previously included. As such, the interaction application 112A determines that the user of the first wearable device $101_{1-N}$ transferred the "SadSally" tile $118_{1-N}$ to the user of the second wearable device $101_{1-N}$, and stores an indication of the transfer in the device data 119 of the first wearable device $101_{1-N}$.

At block 730, the interaction application 112A determines that the first wearable device $101_{1-N}$ includes a tile $118_{1-N}$ that the second wearable device $101_{1-N}$ previously included. The interaction application 112A then determines (or infers) that the user of the second wearable device $101_{1-N}$ transferred the tile $118_{1-N}$ to the user of the first wearable device $101_{1-N}$. For example, the interaction application 112A of the first wearable device $101_{1-N}$ may determine that the first wearable device $101_{1-N}$ now includes the "SleepySam" tile $118_{1-N}$. The interaction application 112A of the second wearable device $101_{1-N}$ may also transmit an indication of the identifier of the "SadSally" tile $118_{1-N}$ to the instance of the interaction application 112A on the first wearable device $101_{1-N}$ within a predefined amount of time. The interaction application 112A may then reference the device data 119 to determine that the first wearable device $101_{1-N}$ now includes a tile $118_{1-N}$ that the second wearable device $101_{1-N}$ had previously included. As such, the interaction application 112A determines that the user of the second wearable device $101_{1-N}$ transferred the "SadSally" tile $118_{1-N}$ to the user of the first wearable device $101_{1-N}$, and stores an indication of the transfer in the device data 119 of the first wearable device $101_{1-N}$. Furthermore, the second wearable device $101_{1-N}$ also stores an indication of the transfers of tiles based on performing the steps 710-730 from the perspective of the second wearable device $101_{1-N}$. At block 740, the first and second wearable devices $101_{1-N}$ output indication of the transfers via their respective LEDs 115, where the respective output is based on the identifier of the received tiles $118_{1-N}$.

Figure 8:
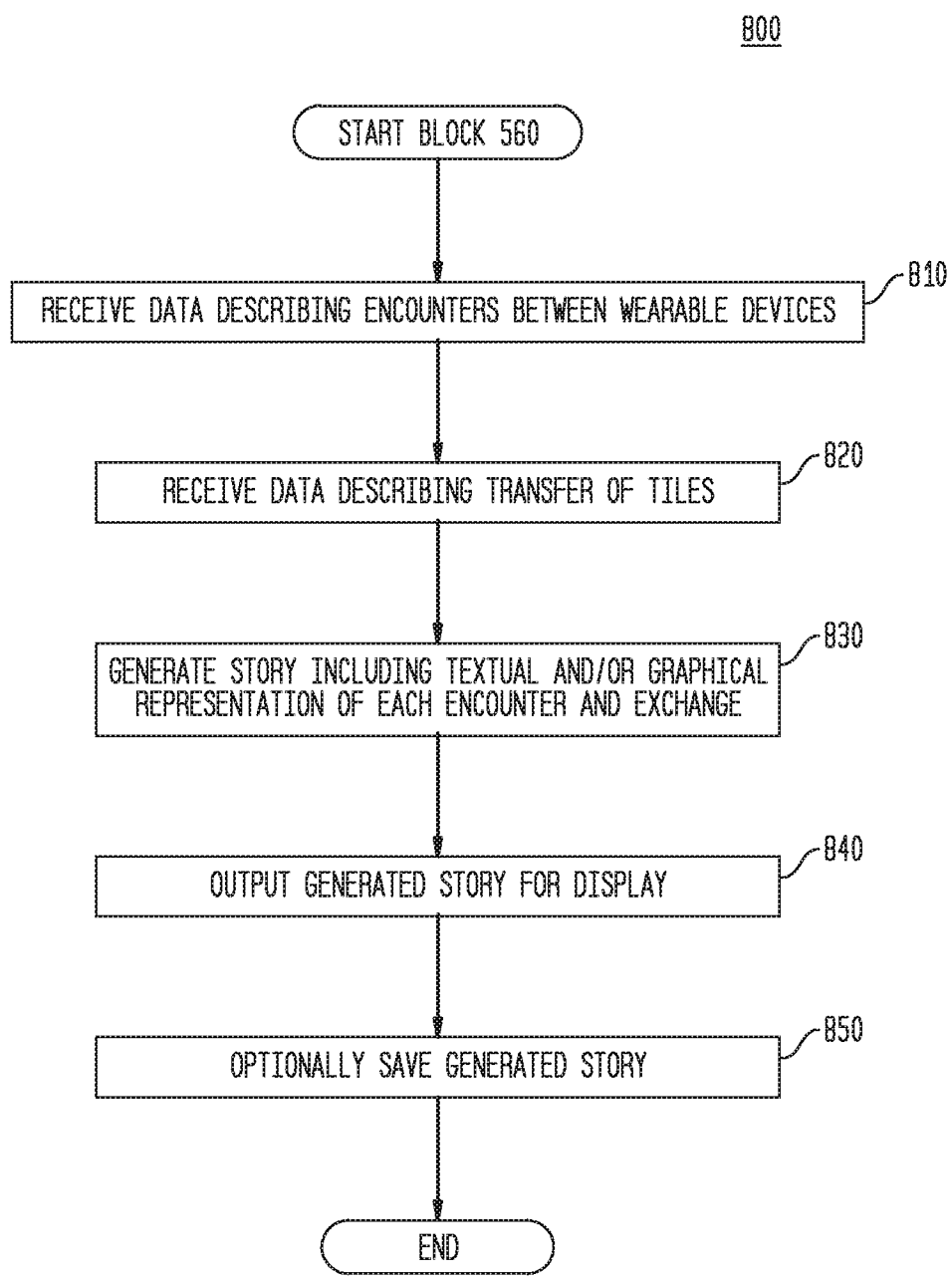
FIG. 8 is a flow chart illustrating a method to generate a graphical user interface depicting interactions between wearable devices and the transfer of tiles between wearable devices, according to one embodiment.

FIG. 8 is a flow chart illustrating a method 800 corresponding to block 560 to generate a graphical user interface depicting interactions between wearable devices and the transfer of tiles between wearable devices, according to one embodiment. As shown, the method 800 begins at block 810, where the interaction application 112B of a first computing device $102_{1-N}$ receives device data 119 from a first wearable device $101_{1-N}$. The device data 119 includes data describing each of a plurality of encounters between the first wearable device $101_{1-N}$ and other wearable devices $101_{1-N}$, including usernames (e.g., from the user profiles 120) of the users of the encountered wearable devices $101_{1-N}$ and any tiles $118_{1-N}$ reported by the encountered wearable devices $101_{1-N}$. At block 820, the interaction application 112B receives device data 119 from the first wearable device $101_{1-N}$ describing the transfer of tiles $118_{1-N}$ between the first wearable device $101_{1-N}$ and encountered wearable devices $101_{1-N}$. The device data 119 may include the identifiers of the transferred tiles $118_{1-N}$ and the associated wearable devices $101_{1-N}$. At block 830, the interaction application 112B generates a story 121 including a textual and/or graphical representation of each encounter between the first wearable device $101_{1-N}$ and other wearable devices $101_{1-N}$ and each exchange of tiles $118_{1-N}$. At block 840, the interaction application 112B outputs the generated story 121 for display. At block 850, the interaction application 112B optionally saves the generated story 121 for future use and/or playback.

FIG. 9 illustrates a system 900 configured to infer the transfer of a physical object associated with a wearable device, according to one embodiment. The networked system 900 includes a computing device $102_N$ of FIG. 1. The computing device 102 may also be connected to other computing devices $102_{1-N}$ and/or wearable devices $101_{1-N}$ via a network 130. In general, the network 130 may be a telecommunications network and/or a wide area network (WAN). In a particular embodiment, the network 130 is the Internet. In another embodiment, the network 130 is a Bluetooth® network.

The computing device $102_N$ generally includes a processor 904 which obtains instructions and data via a bus 920 from a memory 906 and/or a storage 908. The computing device $102_N$ may also include one or more network interface devices 113, input devices 922, and output devices 924 connected to the bus 920. The computing device $102_N$ is generally under the control of an operating system (not shown). Examples of operating systems include the UNIX operating system, versions of the Microsoft Windows operating system, and distributions of the Linux operating system. More generally, any operating system supporting the functions disclosed herein may be used. The processor 904 is a programmable logic device that performs instruction, logic, and mathematical processing, and may be representative of one or more CPUs. The network interface device 113 may be any type of network communications device allowing the computing device $102_N$ to communicate with other computers via the network 130.

The storage 908 is representative of hard-disk drives, solid state drives, flash memory devices, optical media and the like. Generally, the storage 908 stores application programs and data for use by the computing device $102_N$. In addition, the memory 906 and the storage 908 may be considered to include memory physically located elsewhere; for example, on another computer coupled to the computing device $102_N$ via the bus 920.

The input device 922 may be any device for providing input to the computing device 102. For example, a keyboard and/or a mouse may be used. The input device 922 represents a wide variety of input devices, including keyboards, mice, controllers, and so on. Furthermore, the input device 922 may include a set of buttons, switches or other physical device mechanisms for controlling the computing device $102_N$. The output device 924 may include output devices such as monitors, touch screen displays, and so on. As shown, the memory 906 contains the interaction application 112B, while the storage 908 contains the stories 121, each described in greater detail above.

As shown, the wearable device $101_N$ of FIG. 1 also includes a processor 904, a memory 906 executing the interaction application 112A, a network interface 113, and the device data 119, each described in greater detail above. Generally, the system 900 is configured to implement all functionality described above with reference to FIGS. 1-8.

Advantageously, embodiments disclosed herein provide techniques to allow wearable devices to infer when physical tiles have been transferred between the wearable devices. Doing so improves the performance of the wearable devices by saving space and energy.

In the foregoing, reference is made to embodiments of the invention. However, it should be understood that the invention is not limited to specific described embodiments. Instead, any combination of the recited features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the interaction application 112A could execute on a computing system in the cloud and generate stories 121 for a plurality of users. In such a case, the interaction application 112A could store the generated stories 121 at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving an identifier of a first tile connected to a tile interface of a first wearable device;
   updating a device data structure on the first wearable device to indicate the first tile is connected to the first wearable device;
   receiving, by the first wearable device from a second wearable device via wireless data transmissions, the identifier of the first tile; and
   determining at the first wearable device, based on the device data structure, that the first tile was transferred from the first wearable device to the second wearable device, wherein the device data structure stores tile state data for both the first and second wearable devices.

2. The method of claim 1, further comprising:
   receiving, by a computing device from the first wearable device via a wireless data connection, an indication of: (i) the transmissions between the first and second wearable devices and (ii) the transfer of the first tile from the first wearable device to the second wearable device;
   generating a story depicting: (i) the transmissions between the first and second wearable devices and (ii) the transfer of the first tile from the first wearable device to the second wearable device; and
   outputting the generated story for display on the computing device.

3. The method of claim 1, wherein the device data structure of the first wearable device indicates that the first tile was connected to the tile interface of the first wearable device within a threshold amount of time.

4. The method of claim 1, further comprising:
   receiving, at the first wearable device, a second tile from the second wearable device; and
   outputting, by a plurality of light emitting diodes (LEDs) of the first wearable device, feedback associated with the second tile.

5. The method of claim 4, further comprising:
   storing, by the first wearable device in the device data structure, an indication that the second tile was transferred from the second wearable device to the first wearable device.

6. The method of claim 4, wherein the first and second wearable devices are within a predefined distance, wherein an identifier of the second tile is received at the first wearable device within a threshold amount of time.

7. The method of claim 1, wherein updating the device data structure comprises storing a first indication that the first tile is no longer connected to the first wearable device and a second indication that the first tile is now connected to the second wearable device.

8. A non-transitory computer-readable storage medium having computer-readable program code embodied therewith, the computer-readable program code executable to perform an operation comprising:
   receiving an identifier of a first tile connected to a tile interface of a first wearable device;
   updating a device data structure on the first wearable device to indicate the first tile is connected to the first wearable device;
   receiving, by the first wearable device from a second wearable device via wireless data transmissions, the identifier of the first tile; and
   determining at the first wearable device, based on the device data structure, that the first tile was transferred from the first wearable device to the second wearable device, wherein the device data structure stores tile state data for both the first and second wearable devices.

9. The computer-readable storage medium of claim 8, the operation further comprising:
   receiving, by a computing device from the first wearable device via wireless data transmissions, an indication of: (i) the transmissions between the first and second wearable devices and (ii) the transfer of the first tile from the first wearable device to the second wearable device;
   generating a story depicting: (i) the communication between the first and second wearable devices and (ii) the transfer of the first tile from the first wearable device to the second wearable device; and
   outputting the generated story for display on the computing device.

10. The computer-readable storage medium of claim 8, wherein the device data structure of the first wearable device indicates that the first tile was connected to the tile interface of the first wearable device within a threshold amount of time.

11. The computer-readable storage medium of claim 8, the operation further comprising:
   receiving, at the first wearable device, a second tile from the second wearable device; and
   outputting, by a plurality of light emitting diodes (LEDs) of the first wearable device, feedback associated with the second tile.

12. The computer-readable storage medium of claim 11, the operation further comprising:
    storing, by the first wearable device in the device data structure, an indication that the second tile was transferred from the second wearable device to the first wearable device.

13. The computer-readable storage medium of claim 11, wherein the first and second wearable devices are within a predefined distance, wherein the identifier of the second tile is received within a threshold amount of time.

14. The computer-readable storage medium of claim 8, wherein updating the device data structure comprises storing a first indication that the first tile is no longer connected to the first wearable device and a second indication that the first tile is now connected to the second wearable device.

15. A system, comprising:
    a computer processor; and
    a memory containing a program which when executed by the computer processor performs an operation comprising:
        receiving an identifier of a first tile connected to a tile interface of a first wearable device;
        updating a device data structure on the first wearable device to indicate the first tile is connected to the first wearable device;
        receiving, by the first wearable device from a second wearable device via wireless data transmissions, the identifier of the first tile; and
        determining at the first wearable device, based on the device data structure, that the first tile was transferred from the first wearable device to the second wearable device, wherein the device data structure stores tile state data for both the first and second wearable devices.

16. The system of claim 15, the operation further comprising:
    receiving, by a computing device from the first wearable device via the wireless data transmissions, an indication of: (i) the transmissions between the first and second wearable devices and (ii) the transfer of the first tile from the first wearable device to the second wearable device;
    generating a story depicting: (i) the transmissions between the first and second wearable devices and (ii) the transfer of the first tile from the first wearable device to the second wearable device; and
    outputting the generated story for display on the computing device.

17. The system of claim 15, wherein the device data structure of the first wearable device indicates that the first tile was connected to the tile interface of the first wearable device within a threshold amount of time.

18. The system of claim 15, the operation further comprising:
    receiving, at the first wearable device, a second tile from the second wearable device; and
    outputting, by a plurality of light emitting diodes (LEDs) of the first wearable device, feedback associated with the second tile.

19. The system of claim 18, wherein the first and second wearable devices are within a predefined distance, wherein an identifier of the second tile is received at the first wearable device within a threshold amount of time, the operation further comprising:
    storing, by the first wearable device in the device data structure, an indication that the second tile was transferred from the second wearable device to the first wearable device.

20. The system of claim 15, wherein updating the device data structure comprises storing a first indication that the first tile is no longer connected to the first wearable device and a second indication that the first tile is now connected to the second wearable device.

* * * * *